2,786,025

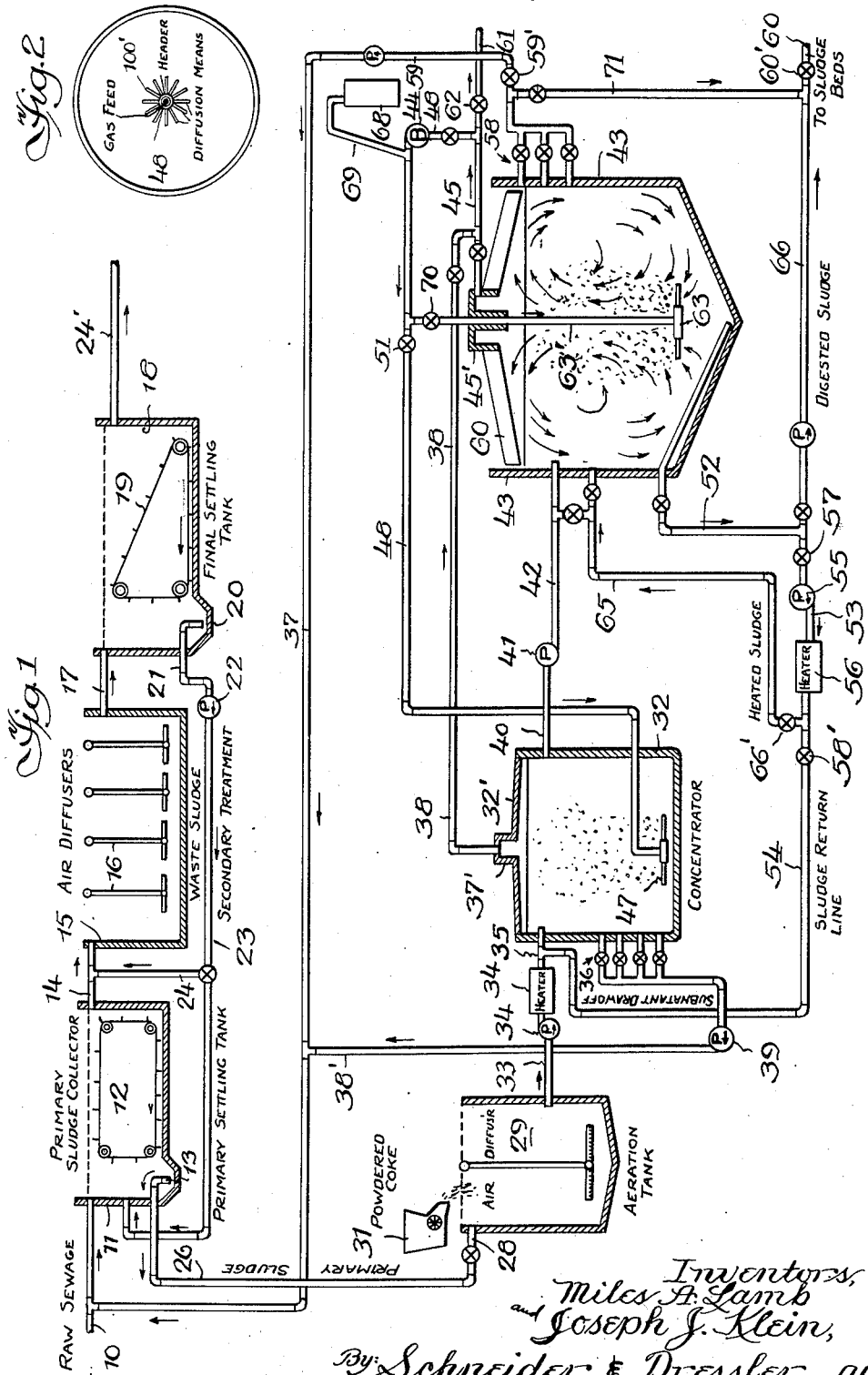

SEWAGE DIGESTION PROCESS

Miles A. Lamb, Chicago, and Joseph J. Klein, Glencoe, Ill., assignors to Chicago Pump Company, a corporation of Delaware Application June 8, 1953, Serial No. 360,284

4 Claims. (Cl. 210—2)

The invention relates to a process for the concentration of raw sludge in a sewage disposal system, and more particularly relates to a process of concentration of raw sewage sludge by flotation of the sludge.

The problem of concentrating raw and activated sludge has been the subject of much study and research in recent years for the reason that concentration substantially reduces the cost, size, and complexity of sludge disposal facilities. For example, the cost of installation and operation of digestion facilities due in part to the problem of handling great quantities of supernatant formed during digestion, may be reduced almost in proportion to reduction in moisture content of the raw sludge. Dewatering facilities likewise are troublesome and expensive and could be reduced in size and cost if sludge could be more simply concentrated.

Prior concentration by flotation processes have required the addition of various chemicals, or application of heat for a relatively long time. These prior processes do not use to advantage the products of the sewage disposal process itself in the concentration process to effect a more efficient sewage disposal installation as in the case of the present invention to be hereinafter described.

In accordance with the present invention, it has been found that concentration of raw sewage may be more effectively and efficiently carried out by introducing gas produced in the digestion process, hereinafter to be referred as "digester gas," within the sewage to be concentrated, to gasify the solid particles in the sludge undergoing concentration, to reduce the density thereof, and to thereby cause the solid particles to float to the top of the sludge mixture.

It appears that the specific use of digester or methane-containing gas itself promotes bacterial growth in the sludge undergoing concentration which further materially accelerates and promotes the flotation of the solid sludge particles in the sludge mixture undergoing concentration. If the gas is introduced into the sludge mixture at too high a rate, excessive motion of the mixture will result which will materially hinder or prevent concentration of the solid particles on the top of the sludge mixture. The digester gas must therefore be gently circulated through the contents of the concentration tank to avoid agitation of the sludge.

The rate of introduction of digester gas into the mixture undergoing concentration should not exceed a maximum rate of $1/10$ of a cubic foot per minute per foot of maximum horizontal internal cross-sectional dimension of a tank housing the sludge, where the tank has a substantially constant cross section. All of the solid sludge particles will then float to the top of the sludge mixture in a short time, relative to that required by existing commercial processes, leaving a clarified subnatant below.

If conditions for anaerobic digestion are present, and the gas circulation rate does not exceed a second maximum prescribed limit, regular digestion rather than concentration by flotation will take place. The proper control of the rate of digester gas circulation therefore determines whether digestion or concentration by flotation takes place.

The digestion of sewage sludge by agitating the sludge with digester gas circulated within the sludge is described and claimed in copending application S. N. 360,282, filed June 8, 1953.

In accordance with a further feature of the present invention, it has been found that the period of time required for complete concentration of raw sewage is further shortened by purposely seeding the sludge to be concentrated with activated or digested sludge. The quantity of seed sludge to be incorporated in the raw sludge to be concentrated should preferably be from 2 to 20% of the raw sludge volume to which it is added.

The process of gas circulation above described has reduced the time necessary for complete concentration to as short a period as one day. This has resulted in a substantial reduction of the size and cost of a sewage disposal installation capable of handling a given volume of sewage since the volume of sludge fed to the digestion facilities for a given amount of sewage influent to the entire system can be reduced by as much as 50% and the volume of the digestion apparatus needed for the relatively time consuming digestion process is reduced in the same amount as the reduction of raw sludge volume by concentration.

Further, the present invention accomplishes this end by utilizing the products of digestion, such as digester gas and digested sludge, to carry out the concentration process to effect an inexpensive and efficient operation.

The invention will be fully understood from the following description, illustrated by the accompanying drawings in which:

Figure 1 illustrates a sewage treating system embodying the present invention, the parts being shown diagrammatically and in section; and Figure 2 is a plan view of the diffusing device in the concentration tank shown in Figure 1.

Before describing the novel features of the present invention, the description to follow will first deal with the conventional treatment of the sewage prior to the concentration of the primary or raw sludge obtained from such preliminary treatment in order to show the environment in which the present invention is practiced, to give an overall picture of a workable system incorporating features of the present invention.

Referring more particularly to Fig. 1 of the drawings, the numeral 10 indicates a conduit through which the raw sewage from the sewage system of a small city, amounting to, say, about one million gallons per day, is discharged into the primary settling tank 11. In general, this raw sewage will have been preliminarily subjected to treatment in the customary comminuting and screening devices to break up and/or remove large foreign objects and may also have been passed through a conventional sedimentation tank. These devices being conventional and in common use, are not shown.

The primary settling tank, which is of sufficient capacity to insure an adequate residence time to permit sedimentation of the sludge, is provided with the usual slow moving sludge collector, diagrammatically illustrated and designated by the numeral 12, and with a sump 13 for the collection of the sludge. In a system handling, say, one million gallons of sewage per day, the amount of sludge collected daily in the tank 11 may be, for example, in the order of ten thousand gallons.

The sewage effluent, after removal of the primary sludge, may be further treated for removal of additional sludge or may be disposed of in any suitable manner, as by dilution, by means of trickling filters, or by other suitable means. As illustrated, it may be subjected to aeration to effect the flocculation of additional sludge, which is then permitted to settle and is preferably added to the sludge collected in the primary settling tank. Thus the effluent from the primary settling tank may pass through a conduit 14 to the aeration tank 15, through which the sewage travels slowly while air is forced into and through the sewage by means of the diffusers 16, which are diagrammatically illustrated. These diffusers may be of any suitable type, for example, such as that shown in the United States patents to Lannert, No. 2,328,655, granted September 7, 1943, and Nordell, No. 2,555,201, granted December 5, 1950, or in the copending application of Lamb, Serial No. 206,237, filed January 16, 1951, and Klein, Serial No. 246,854, filed September 15, 1951.

The aerated sewage leaving the tank 15 passes through a conduit 17 into the final settling tank 18, which is of such capacity that the sewage moves slowly through it, permitting settling of the flocculated sludge. This tank is likewise provided with the usual slow moving sludge collector, illustrated diagrammatically and designated by the number 19. The sludge is collected in a sump 20. As is customary, the sludge collected in the sump 20 is withdrawn through pipe 21 by pump 22, which discharges it through the pipe 23 into the primary settling tank 11, where it settles and collects in the sump 13 in admixture with the primary sludge. If desired, a part of the sludge collected in settling tank 18 may be returned through the line 24 to the conduit 14 and the aeration tank 15.

The treated sewage effluent from the settling tank 18 passes out through the effluent conduit 24' for disposal in the usual manner, such as filter beds, or may be handled in any other desired manner.

Instead of being handled in an aeration system of the character illustrated, the sewage effluent leaving the primary settling tank 11 may be disposed of in any other suitable manner; for example, by filtration or, where permissible, by stream dilution. In such case, the sludge collected in primary settling tank 11 will consist entirely of primary or raw sludge, or of such sludge admixed with any ripe sludge that may be deposited from supernatant liquor from the anaerobic digestion of the sludge that may be returned as hereinafter described.

The sludge collected in tank 11 is withdrawn from sump 13 through line 26 by pump 27 and discharged through line 28 into the aeration and mixing tank 29. While the withdrawal of the primary sludge from the tank 11 may be continuous, in ordinary operation, it is generally preferred that it be intermittent. Usually such withdrawal is effected about three times a day, about one-third of the total of the sludge collected per day being removed from tank 11 each time. Thus with a system as hereinbefore referred to, handling approximately 1,000,000 gallons of sewage per day and in which the total collection of sludge is about 10,000 gallons per day, the amount of sludge removed from tank 11 at each time of such removal will, considering normal variations, be in the order of 3,000 to 3,500 gallons. The capacity of the aerating and mixing tank 29 may have an effective volume equal to or greater than the raw sludge pump capacity per minute.

In the aeration tank 29 the sludge is aerated to a certain extent, preferably using air diffusers, of which one is illustrated at 30, these being the same or of the same character as the air diffusers in the aeration tank 15 previously referred to. The amount of air used is in the range of 25% to 100% by volume on the sludge, preferably about 75%. Thus with the amount of sludge being handled per pumping period of about 3,500 gallons, the amount of air introduced would be in the range from 115 to 470 cubic feet and preferably about 350 cubic feet. Depending upon the number of air diffusers used and the capacity of each of the diffusers, the time of retention of the sludge in the aerating and mixing tank may be from 1 to 5 minutes. Thus with diffuser tubes, the proper number of such air diffusers can be selected to furnish air at the approximate rate of raw sludge pumpage through the aeration tank, i. e. at approximately equal volumes.

The mixing of the air with the raw sludge may be carried out at any normal operating temperature above the freezing point, say in the range of from 32° F. to 90° F. The air utilized should be at a temperature of not less than 30° F. and its temperature may be higher, say up to 150° F., and may contribute to maintaining the sludge in the aeration tank 29 above freezing temperature during cold weather.

Upon the completion of the introduction of the desired quantity of air, or preferably slightly before its completion, an adsorptive material is thoroughly admixed with the sewage sludge and suspended therein. Preferably finely divided coke is employed, the coke being ground sufficiently finely so that the greater portion thereof, say 90%, will pass through a 200 mesh sieve and all of it will pass through a 75 mesh sieve. The powdered coke may be introduced into the aerating and mixing tank 29 in any suitable manner, for example, from the hopper 31. When introduced in the latter stages of the aeration process, the introduction of the air effects the desired admixture of the coke with the sludge. Supplementary mechanical mixing devices may be employed, if desired. As is readily apparent, the powdered coke may also be admixed with the sludge promptly after its aeration or in its flow from the aeration and mixing tank 29 to the concentration tank hereinafter referred to, any suitable mixing means being employed. The aeration of the raw sewage and addition of an adsorptive material, if utilized, should preferably precede rather than follow the concentration process to be described. Other adsorptive materials may be employed instead of powdered coke, such as fullers earth, silica gel, diatomaceous earth or the like. Coke is, however, preferred. The proportion of finely divided adsorptive material, such as coke, that is added is suitably in the order of 0.5 to 2.5 parts per 100 parts of sludge, by weight, and preferably, in the case of coke, is about 1 part per 100 parts of sludge by weight.

It should be noted that although the preliminary aeration of the raw sludge to undergo digestion is preferred, such aeration may be omitted. The primary operation to be performed in the digestion process of the present invention is one of anaerobic digestion which does not require the presence of oxygen to effect digestion.

Promply after the aeration of the sludge and its intermixture with the coke or other adsorptive material, the sludge is introduced into the concentration tank 32. The sludge may suitably be withdrawn from the aeration and mixing tank 29 through line 33 by pump 34. The raw sludge entering concentration tank 32 is heated in a suitable heater 34' which may, for example, be similar to the heater disclosed in copending application Serial No. 290,848, on a Method and Apparatus for Treating Sewage Sludge, filed May 31, 1952, by Milton Spiegel and Miles H. Lamb. The temperature to which the raw sludge is heated is not critical, but the sludge is preferably heated to a temperature of from 80° to 100° F.

Although it is preferred to heat the sludge externally of the concentration tank 32 to avoid unnecessary obstruction from heating coils within the concentration tank, such heating may be carried on, if desired, within the concentration tank. In either case, the concentration tank should be insulated to prevent the escape of heat therefrom.

The sludge entering the concentration tank may, for example, consist of from about 3 to 8% by weight of solids out of which 40% to 70% may be volatile solids.

The aerated raw sludge (or the raw sludge, if the aeration step is omitted) in sludge concentration tank 32 is concentrated by being floated to the surface of the mixture therein in a manner to be described. A relatively clarified liquor (subnantant) forms in the bottom of concentration tank 32 as a result of the concentration process, which is drawn off from the lower level of the concentration tank through one or more withdrawal pipes indicated generally by numeral 36. The subnatant may then be discharged into primary settling tank 11 as by pump 39 via lines 38' and 37. The concentrated sludge floating in the upper portion of concentration tank 32 may be suitably withdrawn from this tank through line 40 by pump 41 and discharged through line 42 to a digester tank 43. This concentrated sludge may include as much as 8% to 12% solids by weight.

Concentration tank 32 is preferably of square or circular cross section and includes a cover 32' of the fixed or floating variety, a fixed one being shown, to isolate the contents therein from the atmosphere.

The raw sludge is concentrated in concentration tank 32 as by digester gas fed from a digester tank, such as tank 43, by means of a blower 44 from a gas draw-off line 45 communicating with the gas collecting dome 45' of digester tank 43. The gas passes through line 48 and through a gas diffusing device 47, similar to diffusers 16, located preferably near the bottom and center of the concentration tank 32. The diffusing device 47 should produce a slowly rising column of gas extending over a considerable area. This slowly rising column of gas should not agitate the sewage sludge or impart thereto a circulatory movement.

Diffusing device 47 preferably would include a series of diffusing elements or tubes arranged near the center of the bottom of concentration tank 32.

Figure 2 shows an exemplary arrangement of diffuser tubes which may be used in concentration tank 32. Thus a plurality of diffuser tubes 100' extend radially from an enlarged end portion of gas feed line 48. A relatively large cylindrical column of gas is thereby produced. Other diffuser tube arrangements may be used, if desired. For example, the various arrangements described and illustrated in said copending application Serial No. 360,282 may be used for diffusing device 47.

The diffuser tubes may take any one of a variety of forms, as for example the diffuser tank elements described in U. S. Patent No. 2,555,201 to Nordell granted December 5, 1950, or those disclosed in application Serial No. 206,237, filed by Miles A. Lamb on January 16, 1951, and in application Serial No. 246,854, filed by Joseph J. Klein on September 15, 1951. These tubes direct gas upward along their upper surfaces. Diffusing device 47 should preferably be located in the center and bottom third of the concentration tank and at least a few feet above the bottom of the tank. In order to generate a column of gas over a considerable area, the diffuser tube elements should be equally dispersed about a region extending no less than about 7% of the diameter of the tank, in the case of a tank of circular cross section, or about 7% of the diagonal of a rectangular tank. Circular or square tanks are preferred for use as concentration tanks.

Gas in the form of bubbles rises to the surface of the contents in concentration tank 32. The solid particles in the raw sludge undergoing concentration are thereby gasified to reduce the density thereof and cause the solid particles to float to the top of the sludge mixture.

Excessive motion of the mixture caused by the flow of digester gas through the sludge in the concentration tank must be prevented or else the solid sludge particles will not remain concentrated at the top of the sludge mixture. The digester gas must therefore be gently circulated through the contents of the concentration tank. To effect this end, the rate of flow of gas through gas diffusing device 47 is kept within the limits of from $\frac{1}{20}$ to $\frac{1}{10}$ of a cubic foot per minute per foot of internal diameter of concentration tank 32, assuming that the concentration tank 32 has a substantially constant circular cross section. With this limited gas flow, sludge particles will be floated to the top of the raw sludge mixture until substantially all of the solid particles in the concentration tank are concentrated as a floating mass on the top of the mixture. A clarified subnatant then remains below the concentrated sludge. If the rate of gas diffusion were increased above about $\frac{1}{10}$ of a cubic foot per minute per foot of tank diameter there would be excessive turbulence and the solids concentration would not build up. A valve 51 in gas line 48 is provided to control the amount of digester gas fed to concentration tank 32.

Cover 32' of the concentration tank includes a gas collecting dome 37' which communicates with a line 38 leading to the gas-drawoff line 45 of digester tank 43. The gas fed to concentration tank 32 is thus recirculated through the system, resulting in an economical utilization of the gaseous products of digestion.

The above specified concentration process is applicable to concentration tanks having other than circular cross sections if the basis for the desirable gas flow rate is taken, for example, on the basis of the longest diagonal of the horizontal cross section of the concentration tank, assuming that the tank has a constant rectangular cross section. This will be described in more detail hereinafter in connection with the description of digester tank 43, where the rate of flow of gas within the digester tank is also dependent on tank diameter or longest diagonal dimension.

It has been found that the length of time required to completely concentrate sewage sludge in concentration tank 32 can be materially reduced by introducing digested sludge as seed sludge from digester tank 43 into the concentration tank. Accordingly, a line 52 communicating with the bottom of digester tank 43 carries a portion of the digested sludge removed from digester tank 43 to the concentration tank 32 through branch lines 53 and 54, including pump 55 and heater 56. Heater 56 maintains the temperature of the sludge at approximately the same temperature as the concentration tank contents.

The amount of seed sludge which is mixed with the raw sludge carried to concentration tank 32 should be about 2% to 20% of the raw sludge volume in concentration tank 32 at the time of mixing. Accordingly, the volume of raw sludge in concentration tank 32 to undergo concentration is determined by any suitable method soon after it is pumped thereto, and the proper amount of seed sludge is metered to the concentration tank through valves 57 and 58' located, respectively, in lines 53 and 54 leading from the main draw-off sludge line 52.

The combination of gas concentration and seeding of the concentration tank above described materially reduces the time required to complete concentration from about two days, more or less, to as little as one day. The seeding feature has the further advantage that it increases the volume of subnatant produced by as much as 100%.

The use of seed sludge to improve the concentration of raw sewage has also been found to shorten the time for concentration, when used with other concentration processes such as a flotation process utilizing only heat and time to effect concentration. This is more fully described and is claimed in the copending application of Philip F. Morgan, Serial No. 361,019, filed June 11, 1953.

As previously stated, the concentrated sludge from concentration tank 32 is pumped to the digester tank 43 through lines 40 and 42 by a suitable pump 41. If desired, gravity feed may be utilized to carry the concentrated sludge to the digester tank. This may be done by locating the inlet to the digester tank below the outlet of concentration tank 32.

In ordinary operation, the digester tank will be filled to its normal operating level with sludge undergoing digestion. Just prior to the introduction of the sludge from the concentration tank, the supernatant digested sludge liquor in amount corresponding to the amount of concentrated sludge to be introduced will be drawn off from an upper level in the digestion tank through one or more of the withdrawal pipes indicated generally by reference character 58, and discharged through valve 59' and line 59 into line 37 leading to the primary settling tank 11, or to sludge drying beds through line 71, valve 60' and line 60.

The digester tank 43, as illustrated, is a conventional digestion tank for anaerobic digestion of the sludge and is provided with a floating roof 60 having a gas collecting dome 45', which is well known in the art. A fixed roof many be used, if desired. The contents of the digester tank are thereby isolated from the atmosphere.

Gas drawoff line 45 communicates with gas collecting downe 45' and carries the gaseous products of the digestion process to any one of a plurality of locations. Thus, drawoff line 45 may communicate with a line 61 leading to suitable equipment for utilizing such gas, such as gas engines or burners, or to a gas holder. A valve 62 controls the amount of gas carried by line 61. Gas drawoff line 45, as previously stated, communicates with valved line 48 leading to gas diffusing device 47 in concentration tank 32. A branch line 63' extending from line 48 ahead of valve 51 into the digester tank, is provided to recirculate digester gas, by means of blower 44, to the digester tank 43 to effect an accelerated digestion of the sewage sludge in accordance with the present invention. Branch line 63' communicates with a gas diffusing device 63 which is similar to gas diffusing device 47 in concentration tank 32.

The rate at which digester gas is introduced into the digester tank and the desired velocity of movement of the contents of the digester tank desired should fall within well defined limits in order to aid the digestion process. Valve 70 in line 63' controls the quantity of gas circulated in the digester tank. These limits are described in our copending application, Serial No. 360,282, filed June 8, 1953. If an insufficient amount of gas is circulated in the digester tank, the sewage solids tend to accumulate as a floating mass upon the top of the sewage liquid, thereby seriously inhibiting the normal anaerobic digestion of the sewage solids. If the amount of digester gas circulated is too great, excessive turbulence takes place within the tank with the result that frothing takes place and thereby interferes with the normal separation of the digester gas from the material undergoing digestion.

In addition to the function of heating the seed sludge fed from digester tank 43 to concentration tank 32, heater 56 also performs the function of maintaining the temperature of the sludge in the digester tank 43 at a desired level, for example, from 90 to 95° F. Pump 55 is thus periodically put into operation to circulate the contents of digester tank 43 through heater 56 in line 53, through valve 66' and line 65 where the heated sludge is discharged into the digester tank.

After digestion is complete, the recirculation of gas within the digester tank is stopped to allow the liquid and solid particles in the digested sludge to separate. The digested sludge then settles to the bottom of the digester tank where it is discharged through line 66 and line 60 to sludge drying beds and/or is directed to some other location such as to concentration tank 32 or to another digester tank where the sludge is utilized as seed sludge, as above described.

The digestion process is considered complete when judged by either one of the following standards. Digestion is complete when 7½ to 10 cubic ft. of gas per pound of volatile solids in the sludge added to the digester is evolved or when the volatile solids are reduced 40% to 50% by weight. On either of these standards, sewage sludge may be digested by the process of the present invention in about ten days. On the same standards, the digestion of sewage sludge as it is generally being carried out commercially, takes about thirty days.

The effectiveness of the digestion process of the present invention may be maintained indefinitely by saturating the gas which is circulated within concentration tank 32 and digester tank 43 with moisture. A humidifier or steam generator 68 is connected to gas line 48 through a line 69. Any suitable source of moisture may be used. The moisture serves the purpose of preventing the clogging of the diffuser tubes making up diffusing devices 47 and 63, respectively, so that these devices can operate for long periods of time without loss of efficiency and without the need for frequent cleaning. The humidification of a gaseous body used in conjunction with diffuser tube elements for this purpose is disclosed and claimed in copending application Serial No. 243,702, John A. Tapleshay and Carl H. Nordell, filed August 25, 1951, now Patent No. 2,694,042, issued November 9, 1954.

One exemplary embodiment of a digester tank installation is as follows:

Tank diameter (inner diam. of circular tank)___ft__ 70
Tank depth_____ft__ 25
Depth of sludge_____ft__ 25
Depth of diffusing device from top of sludge____ft__ 23
Diameter of diffusing device (circular arrangement of Fig. 2)_____ft__ 5¾
Total rate of gas flow_____cu. ft./min__ 5

The re-introduction or recirculation of the digester gas in the concentration tank 32 and digester tank 43 appears to provide a more favorable medium for the propagation and activity of the anaerobic bacteria which effects the concentration of raw sewage sludge and also the decomposition of the sludge.

In consequence thereof, a more effective digestion is secured in a given time and the digestion process is itself materially accelerated. Thus, it has been found that, by the use of the present process, the time required to effect a given extent of digestion or decomposition may be decreased by approximately 50% or more. In this way, the capacity of a given system may be materially increased.

While reference in the preceding description has been made to the recirculation of digester gas, it has been found that similar results may be secured by the introduction into the digester or concentration tanks of substantially pure methane in amounts corresponding to 50 to 75% of the amounts of digester gas hereinbefore referred to. Other methane-containing gases, such as natural gas, for example, may also be employed in amounts sufficient to provide equivalent quantities of methane gas. In such case, the proportions of sulfur compounds, aromatic hydrocarbons, carbon monoxide and other undesirable constituents in the gas used should be controlled to such an extent as not to impair the effective action of the active organisms in the digestion process. Thus, natural gas which has been treated with the customary reagents for sulfur removal so as to make the gas suitable for use for synthesis gas may be employed in the present process.

By the term "methane-containing gas" or "digester gas," as used herein, is meant gases including methane as the active constituent in proportions of from about 10% to 15% to 100% and preferably 50% to 70%, the remaining constituents being inert or in proportions innocuous to the organisms active in the digestion process. The remaining constituents of the gas may thus be carbon dioxide, nitrogen, helium, hydrogen, ethane, propane or mixtures thereof.

Numerous modifications may be made of the preferred process of the instant invention as above described without deviating from the broader, generic aspects of the present invention. For example, although the concentration process of the present invention is preferably utilized in a system including anaerobic digestion apparatus where methane-containing gas and digested sludge is readily available, the invention in its broader aspect does not require the presence of anaerobic digestion apparatus if methane-containing gas or digested sludge is otherwise available.

Additionally, the number and size of the concentration and digester tanks may be varied to suit the particular needs of a situation.

The gas flow rate used in the concentration process of the present invention, being based on the cross sectional dimensions of the concentration tank, assumes a tank having a substantially constant cross section. If a concentration tank has a widely varying cross section, the figures given above for the desired range of gas flow rate may need to be adjusted somewhat. However, economical and other considerations favor the use of tanks having a substantially uniform cross section. Concentration tanks are generally of uniform cross section.

We claim:

1. In the anaerobic digestion of sewage sludge, wherein a body of such sludge is subjected to anaerobic digestion in an enclosed container with the production of methane-containing gas, the steps of removing such methane-containing gas from said container and introducing same into a second container containing sludge to be later digested in said first mentioned container, as a rising column of gas, at a rate not to exceed $\frac{1}{10}$ of a cubic foot per minute per foot of longest horizontal internal cross-sectional dimension of said second container, to gasify the solids in the sludge and to cause same to rise to the surface of the sludge mixture, and recirculating said gas produced in said first mentioned container in the said container to effect circulation of sludge therein and thereby promote the anaerobic digestion of the sludge therein.

2. The method of claim 1 wherein the gas introduced into said second container to effect concentration is collected and re-introduced into said first mentioned container.

3. The method of claim 1 wherein the said gas is introduced into said second container in an amount exceeding $\frac{1}{20}$ of a cubic foot per minute per foot of longest horizontal internal cross-sectional dimension of said second container.

4. In the anaerobic digestion of sewage sludge, wherein a body of such sludge is subjected to anaerobic digestion in an enclosed container with the production of methane-containing gas, the steps of removing such methane-containing gas from said container and introducing same into a second container containing sludge to be later digested in said first mentioned container, as a rising column of gas, at a rate not to exceed $\frac{1}{10}$ of a cubic foot per minute per foot of longest horizontal internal cross-sectional dimension of said second container, to gasify the solids in the sludge and to cause same to rise to the surface of the sludge mixture, removing the gasified sludge solids from the said second container and introducing the same into said first mentioned container, and recirculating said gas produced in said first mentioned container in the said container to effect circulation of sludge therein and thereby promote the anaerobic digestion of the sludge therein.

References Cited in the file of this patent

UNITED STATES PATENTS

| Number | Name | Date |
|---|---|---|
| 1,056,548 | Imhoff | Mar. 18, 1913 |
| 1,820,976 | Imhoff | Sept. 1, 1931 |
| 2,190,598 | Fischer | Feb. 13, 1940 |
| 2,528,649 | Genter et al. | Nov. 7, 1950 |
| 2,615,842 | Kraus | Oct. 28, 1952 |
| 2,638,444 | Kapper | May 12, 1953 |
| 2,640,027 | McNamee et al. | May 26, 1953 |